UNITED STATES PATENT OFFICE.

ROBERT KAHN, OF FRANKFORT-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

ARSENO COMPOUNDS AND PROCESS OF MAKING SAME.

1,033,904.     Specification of Letters Patent.     Patented July 30, 1912.

No Drawing.     Application filed July 5, 1911. Serial No. 636,899.

*To all whom it may concern:*

Be it known that I, ROBERT KAHN, Ph. D., a citizen of the Empire of Germany, residing at Frankfort-on-the-Main, Germany, have invented certain new and useful Improvements in Arseno Compounds and Processes of Making Same, of which the following is a specification.

I have found a new process for preparing arseno compounds, which consists in combining aromatic primary arsins with aromatic arsenoxids. The reaction takes place according to the equation:

$$R_1-AsH_2+R_2-AsO = [R_1-As=As-R_2]+H_2O$$

wherein $R_1$ and $R_2$ mean any aromatic residue.

The compounds obtainable by the new process are of great value for therapeutical purposes.

Whereas the aromatic arsenoxids used in the new process can be produced from phenylarsinic acid and its derivatives by means of weak reducing agents, as already described for instance in U. S. Patent No. 907,978, the aromatic primary arsins are obtained from phenylarsinic acid and, as I have found, also from its derivatives, by treatment with nascent hydrogen in a strongly acid solution. The aromatic arsenoxids may also be employed in the form of their salts which are produced from the arsenoxids by the action of strong acids, for instance, the phenylglycinarsindichlorid

produced from the phenylglycinarsenoxid

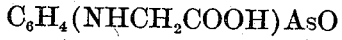

by reaction with concentrated hydrochloric acid.

The procedure may for instance be as follows: 217 gr. or 4-aminobenzenearsinic acid are dissolved in 2.5 liters of methyl alcohol and then 400 gr. of zinc dust added. Into this mixture 1.5 liters of hydrochloric acid (specific gravity 1.19) are run, while stirring; after having stirred the mass for some time, the zinc dust remaining undissolved may be filtered off. The filtrate is rendered alkaline and the 4-aminobenzene-arsin is distilled off by steam. From the distillate it is extracted by means of ether, and when the ether has been evaporated it remains as a white substance gradually turning yellow when exposed to the air. 169 gr. of the 4-aminobenzene arsin thus produced are dissolved in 1 liter of hydrochloric acid of normal strength and 9 liters of water and this solution is mixed, while cooling, with a solution of 184 gr. of 4-oxyphenylarsenoxid in 2 liters of methyl alcohol and there are then immediately added 2 liters of 2 N-hydrochloric acid. The mixture assumes an intense yellow color, and after having rested for several hours there are added to it 4 liters of a 2 N-sodium acetate solution, whereupon the 4-amino-benzene-arseno-4-oxybenzene separates in the form of a yellowish precipitate which, when dry, is a yellow powder decomposing when heated to about 200° C.; it is soluble in hydrochloric acid and caustic soda lye, insoluble in water, alcohol and ether.

The new compound has a bactericidal action in diseases caused by trypanosomes.

Having now described my invention what I claim is:

1. The process of preparing arseno compounds which consists in combining aromatic arsenoxids with aromatic primary arsins.

2. The process of preparing an arseno compound, which consists in combining 4-aminobenzenearsin with 4-oxybenzenearsenoxid.

3. As a new product, the 4-aminobenzene-arseno-4-oxybenzene, being a yellow powder, decomposing when heated to about 200° C., insoluble in water, alcohol and ether, soluble in caustic soda lye and diluted hydrochloric acid, and having a bactericidal action upon trypanosomes.

In testimony whereof, I affix my signature in presence of two witnesses.

ROBERT KAHN.

Witnesses:
   JEAN GRUND,
   CARL GRUND.